US012234793B1

(12) United States Patent
Barreiro

(10) Patent No.: US 12,234,793 B1
(45) Date of Patent: Feb. 25, 2025

(54) FUEL CONDITIONING SYSTEM

(71) Applicant: Manuel Barreiro, Ellenbrook (AU)

(72) Inventor: Manuel Barreiro, Ellenbrook (AU)

(73) Assignee: Manuel Barreiro, Ellenbrook (AU)

( * ) Notice: Subject to any disclaimer, the term of this patent is extended or adjusted under 35 U.S.C. 154(b) by 0 days.

(21) Appl. No.: 18/719,346

(22) PCT Filed: Dec. 19, 2022

(86) PCT No.: PCT/AU2022/051532
§ 371 (c)(1),
(2) Date: Jun. 13, 2024

(87) PCT Pub. No.: WO2023/115113
PCT Pub. Date: Jun. 29, 2023

(30) Foreign Application Priority Data

Dec. 21, 2021 (AU) ................................ 2021904166

(51) Int. Cl.
*F02M 25/025* (2006.01)
*F02M 25/022* (2006.01)
*F02M 37/52* (2019.01)

(52) U.S. Cl.
CPC ...... *F02M 25/025* (2013.01); *F02M 25/0225* (2013.01); *F02M 37/52* (2019.01)

(58) Field of Classification Search
CPC ............... F02M 25/022; F02M 25/025; F02M 25/0225; F02M 37/08; F02M 37/14; F02M 37/52; F02M 27/04; F02M 51/04; F02M 29/02; F02M 3/06; F02M 11/02; C10L 1/02; C10L 10/02; C10L 2290/40
See application file for complete search history.

(56) References Cited

U.S. PATENT DOCUMENTS 4,295,969 A 10/1981 Hagberg
5,154,142 A 10/1992 Kamo
7,195,005 B2 * 3/2007 Yoshimoto ............. F02P 23/04 123/538
9,347,405 B2 * 5/2016 Jung ..................... F02M 27/08
(Continued)

FOREIGN PATENT DOCUMENTS

JP 2011-038000 A 2/2011
KR 20090109866 A 10/2009
(Continued)

*Primary Examiner* — Grant Moubry
(74) *Attorney, Agent, or Firm* — Carrier, Shenda & Associates P.C.; Joseph P. Carrier; Fulchand P. Shende

(57) ABSTRACT

A fuel conditioning system for an engine comprises a plurality of mixing vessels that include an input mixing vessel and an output mixing vessel, at least one inlet for receiving fuel and water into the input mixing vessel and at least one outlet for supplying the fuel and water from the output mixing vessel to the engine. A conduit system is arranged to transfer the fuel and water through each of the mixing vessels from the input mixing vessel to the output mixing vessel. Each of the mixing vessels comprises an internal chamber containing a plurality of nebulizing members. The nebulizing members are configured to rotate about a rotational axis extending through the internal chamber to nebulize the fuel and water therein. One or more magnets disposed in the internal chamber to attract ferromagnetic substances present in the fuel and/or water.

20 Claims, 12 Drawing Sheets

(56) References Cited

U.S. PATENT DOCUMENTS

| | | | | |
|---|---|---|---|---|
| 2010/0332108 | A1* | 12/2010 | Kato | F02M 37/44 73/114.43 |
| 2015/0300299 | A1 | 10/2015 | Licitar | |
| 2016/0153408 | A1* | 6/2016 | Amaral | F01M 5/002 123/196 AB |
| 2016/0160813 | A1* | 6/2016 | Amaral | F02M 31/102 123/557 |
| 2021/0363941 | A1* | 11/2021 | Revidat | B01F 23/4105 |

FOREIGN PATENT DOCUMENTS

| | | | |
|---|---|---|---|
| WO | 2011/021473 | A1 | 2/2011 |
| WO | 2015/198231 | A1 | 12/2015 |
| WO | 2019/161852 | A1 | 8/2019 |

* cited by examiner

FUEL CONDITIONING SYSTEM

FIELD

The present invention relates to a fuel conditioning system and, more particularly, a conditioning system for combustible liquid fossil fuels such as diesel and kerosene.

BACKGROUND

An internal combustion engine is a heat engine which involves the combustion of a fuel with an oxidizer, such as air, in a chamber. For example, a diesel engine operates by compressing air to a high pressure and temperature inside the engine's cylinders. Diesel fuel is then injected in atomized form into the hot compressed air in the cylinders. The high temperature causes the injected fuel to evaporate and ignite which releases energy that drives the engine's pistons. The combustion process produces a range of pollutant emissions, such as carbon monoxide, hydrocarbons, particulate matter and nitrogen oxides, which are released in exhaust gases. Combustible fossil fuels often contain metal elements which are released in such gases.

The preceding discussion of the background art is intended to facilitate an understanding of the present invention only. The discussion is not an acknowledgement or admission that any of the material referred to is or was part of the common general knowledge as at the priority date of the application.

SUMMARY

According to the present invention, there is provided a fuel conditioning system for an engine, wherein the fuel conditioning system comprises:

- a plurality of mixing vessels that include an input mixing vessel and an output mixing vessel;
- at least one inlet for receiving fuel and water into the input mixing vessel;
- at least one outlet for supplying the fuel and water from the output mixing vessel to the engine; and
- a conduit system arranged to transfer the fuel and water through each of the mixing vessels from the input mixing vessel to the output mixing vessel, wherein each of the mixing vessels comprises an internal chamber containing a plurality of nebulizing members, wherein the nebulizing members are configured to rotate about a rotational axis extending through the internal chamber to nebulize the fuel and water therein, and one or more magnets disposed in the internal chamber to attract ferromagnetic substances present in the fuel and/or water.

The internal chamber may comprise a plurality of fluid dispensers fluidly connected to the conduit system, wherein the fluid dispensers are arranged about an internal perimeter region of the internal chamber to spray the fuel and water toward the rotational axis.

The nebulizing members and the magnets may be arranged about the rotational axis inward from the fluid dispensers.

The internal chamber may comprise a plurality of elongate supports radially extending from the rotational axis, wherein each of the elongate supports comprises a set of the nebulizing members.

Each of the nebulizing members may comprise a plurality of splines or blades.

Each of the elongate supports may have a set of the magnets attached thereto.

The nebulizing members may be arranged into a plurality of groups of nebulizing members and the magnets may be arranged into a plurality of groups of magnets. In such examples, the plurality of groups of magnets may be interleaved within the plurality of groups of nebulizing members along the rotational axis.

The mixing vessels may be disposed on opposed lateral sides of a drive axle, wherein the drive axle is operatively coupled to the nebulizing members of each of the mixing vessels to rotate the nebulizing members.

The drive axle may be operatively coupled to the nebulizing members of each of the mixing vessels by a gear arrangement.

The gear arrangement may comprise a first set of gears that operatively drive a second set of gears, wherein the first set of gears are connected to the drive axle, and wherein the second set of gears are connected to rotational axles that rotate the nebulizing members.

The mixing vessels may also be disposed above and below the drive axle.

The fuel conditioning system may comprise a mixing device for mixing the fuel and water together in a predetermined ratio before the fuel and water is supplied into the at least one inlet.

The predetermined ratio may be about 70% fuel and 30% water.

The fuel conditioning system may comprise a pump for pumping fuel additive into the fuel and water after the fuel and water has been mixed together by the mixing device.

The fuel additive may comprise an engine lubricant.

The fuel conditioning system may comprise a pair of inlets for receiving the fuel and water into the input mixing vessel respectively.

The fuel conditioning system may also comprise a filter device fluidly connected to the outlet to filter fuel and water flowing from the outlet.

The fuel conditioning system may comprise an electric motor operatively configured to rotate the nebulizing members.

The nebulizing members may be mechanically coupled to a drive axle of the engine to rotate the nebulizing members.

The present invention also provides a diesel engine, wherein the diesel engine comprises the fuel conditioning system described above.

The diesel engine may be connected to an air processing system, wherein the air processing system comprises an air filtration system for supplying filtered air to the diesel engine, and wherein the air processing system also comprises a fuel tank comprising an air intake and an air outflow vent, wherein the air outflow vent is arranged to supply diesel fumes from the fuel tank to the diesel engine.

The air processing system may comprise an air pump for supplying pressurised air into the air filtration system.

The air processing system may be configured to mix the diesel fumes with the filtered air together before supplying the diesel fumes and filtered air to the diesel engine.

The present invention also provides an automobile, wherein the automobile comprises the diesel engine described above.

The automobile may also comprise an air conditioning system, wherein the air conditioning system is arranged such that condensed water produced by the air conditioning system is supplied to the fuel conditioning system to be nebulized with diesel fuel.

The automobile may comprise a control system for controlling the diesel engine and the fuel conditioning system, wherein the control system is configured to execute an engine startup process that includes a warm up phase followed by an operating phase, wherein during the warm up phase the diesel engine runs on diesel without receiving any diesel and water from the fuel conditioning system, and wherein during the operating phase the diesel engine receives diesel and water from the fuel conditioning system for combustion by the diesel engine.

The control system may also be configured to execute an engine shutdown process, wherein during the engine shutdown process the diesel engine stops receiving diesel and water from the fuel conditioning system and runs on diesel to flush any water remaining in the diesel engine.

BRIEF DESCRIPTION OF DRAWINGS

Embodiments of the invention will now be described by way of example only with reference to the accompanying drawings, in which.

DESCRIPTION OF EMBODIMENTS

Figure 1:
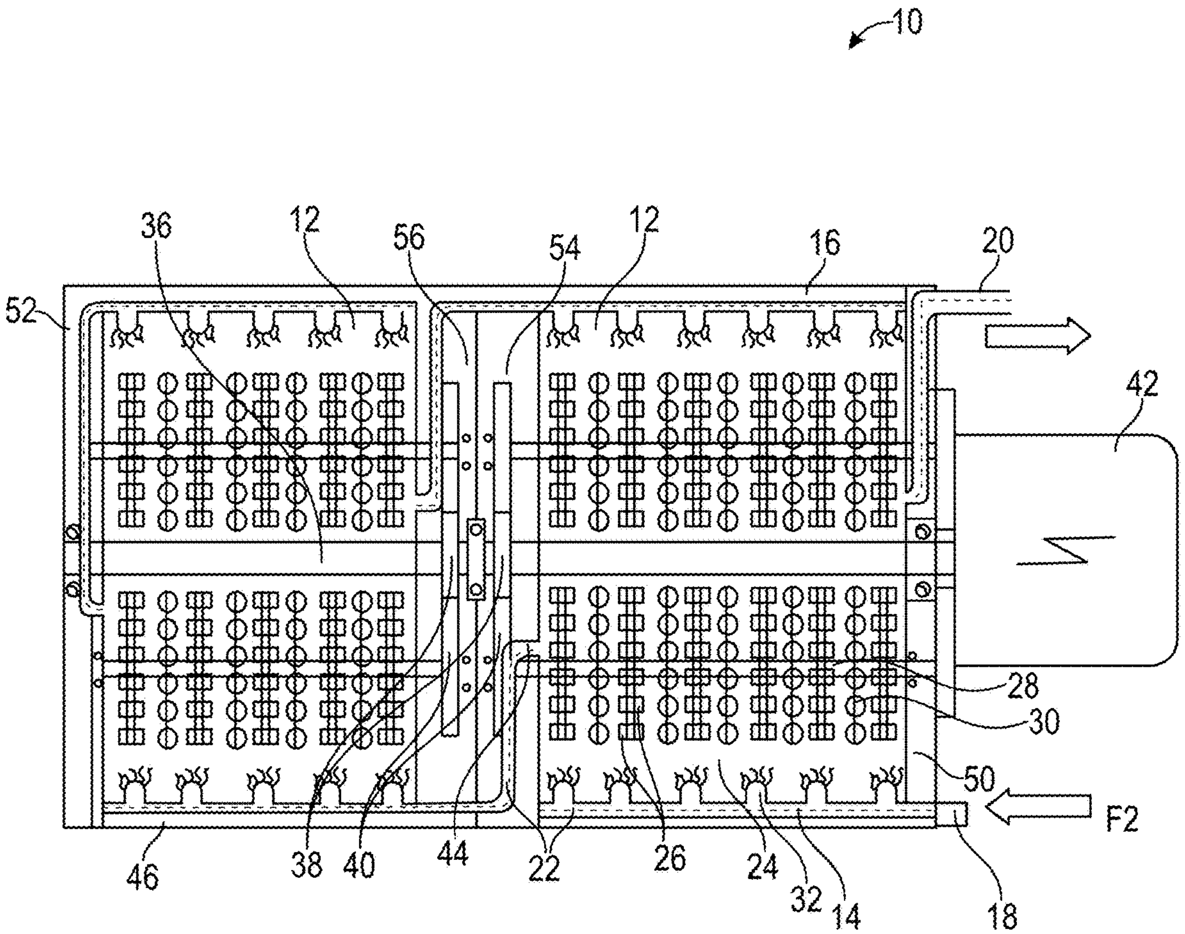
FIG. 1 is sectional plan view of a fuel conditioning system for an engine according to an example embodiment of the invention.
Figure 2:
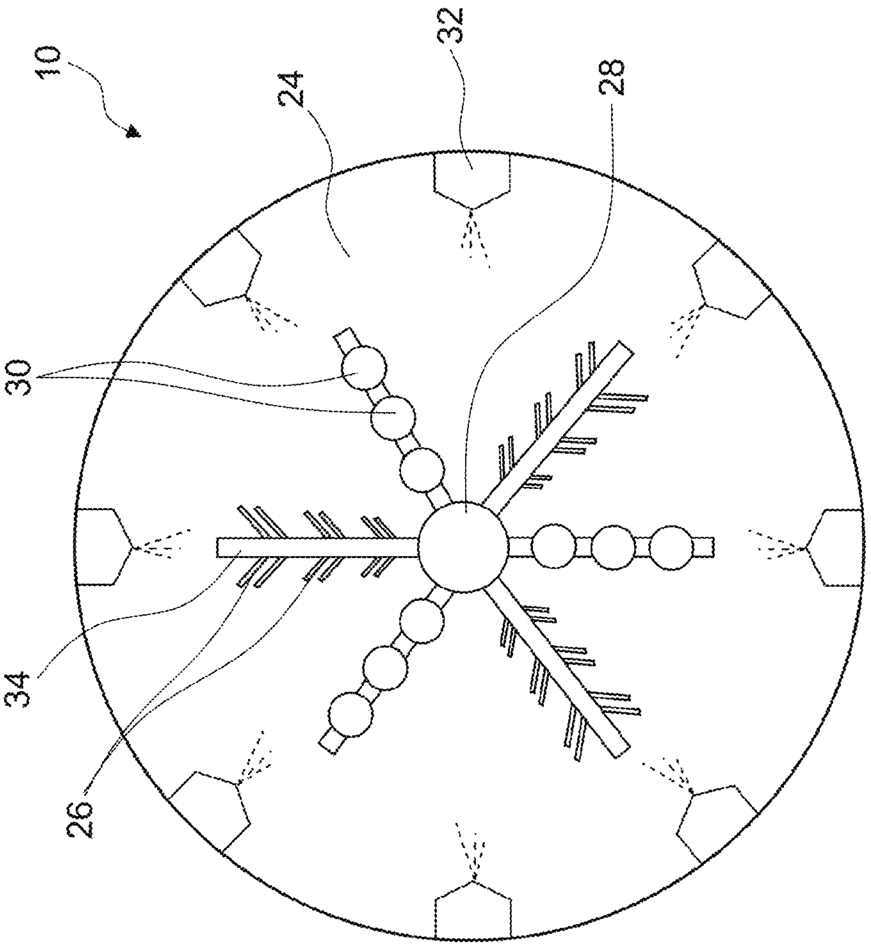
FIG. 2 is a front elevation sectional view of an individual mixing vessel included in the fuel conditioning system.

Referring to FIGS. 1 and 2, an example embodiment of the present invention provides a fuel conditioning system 10 for an engine. The system 10 comprises a plurality of mixing vessels 12 that include an input mixing vessel 14 and an output mixing vessel 16. The input mixing vessel 14 comprises at least one inlet 18 for receiving fuel and water into the input mixing vessel 14. The output mixing vessel 16 comprises at least one outlet 20 for supplying the fuel and water from the output mixing vessel 16 to the engine. The system 10 also comprises a conduit system 22 arranged to transfer the fuel and water through each of the mixing vessels 12 from the input mixing vessel 14 to the output mixing vessel 16. Each of the mixing vessels 12 comprises an internal chamber 24 containing a plurality of nebulizing members 26, wherein the nebulizing members 26 are configured to rotate about a rotational axis 28 extending through the internal chamber 24 to nebulize the fuel and water therein, and one or more magnets 30 disposed in the internal chamber 24 to attract ferromagnetic substances present in the fuel and/or water.

More particularly, in the example depicted each internal chamber 24 comprises a plurality of fluid dispensers 32 fluidly connected to the conduit system 22. The fluid dispensers 32 may be arranged about an internal perimeter region of the internal chamber 24 to spray the fuel and water inwardly toward the rotational axis 28. The nebulizing members 26 and the magnets 30 may be arranged about the rotational axis 28 inward from the fluid dispensers 32. The fluid dispensers 32 may comprise a set of jets that receive the fuel and water from an elongate pipe section of the conduit system 22 extending along the internal perimeter region of the chamber 24. The system 10 is suitable for conditioning a range of different combustible liquid fossil fuels, such as diesel and kerosene. The example depicted is described with reference to diesel fuel.

Figure 3:
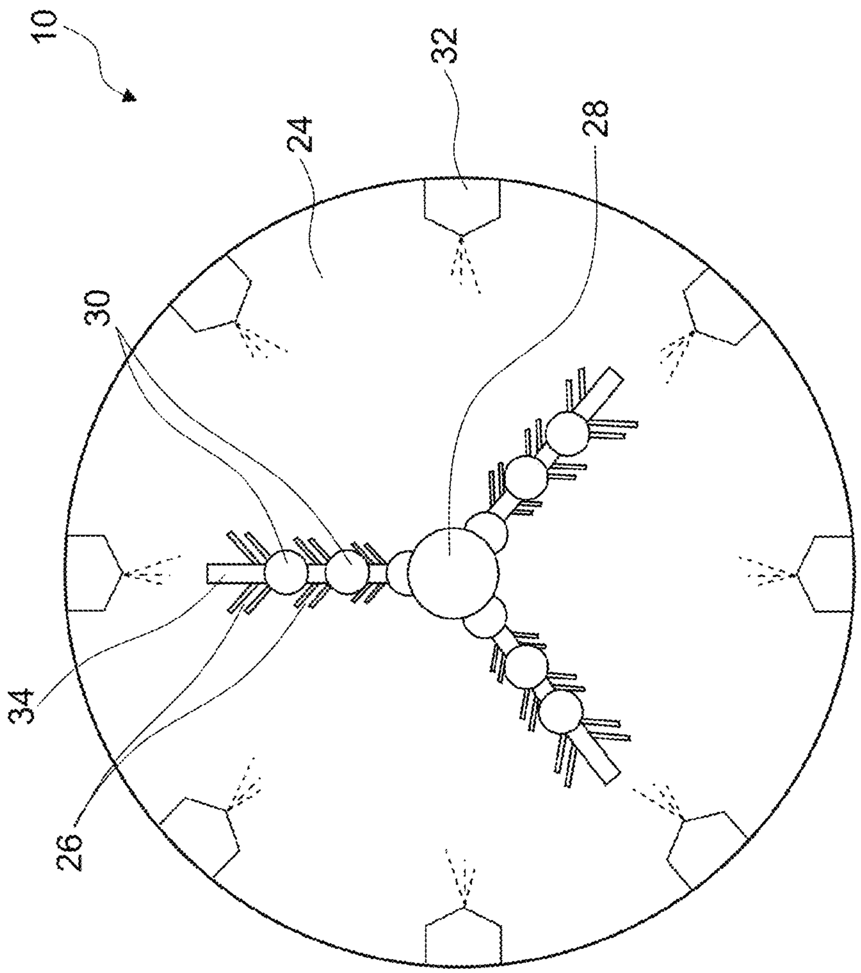
FIG. 3 is a front elevation sectional view of an individual mixing vessel included in a fuel conditioning system according to an example embodiment of the invention.

The magnets 30 may be permanent magnets or electromagnets. In FIG. 1, the nebulizing members 26 are shown schematically using box-shaped symbols and the magnets 30 are shown schematically using circular symbols. As shown in FIG. 2, each internal chamber 24 may comprise a plurality of elongate supports 34 that radially extend from the rotational axis 28. Each elongate support 34 may comprise a set of the nebulizing members 26 attached thereto. The nebulizing members 26 may comprise splines or blades that outwardly extend from the support 34. As shown in FIG. 1, the nebulizing members 26 may be arranged into a plurality of groups and the magnets 30 may also be arranged into a plurality of groups. The groups of magnets 30 may be arranged such that they are interleaved within the groups of nebulizing members 26 along the rotational axis 28. In such examples, the groups of magnets 30 remain static during use while the groups of nebulizing members 26 rotate about the rotational axis 28. As shown in FIG. 3, in other examples each support 34 may have a set of the magnets 30 attached to the support 34 so that the magnets 30 and nebulizing members 26 rotate together about the rotational axis 28.

Figure 4:
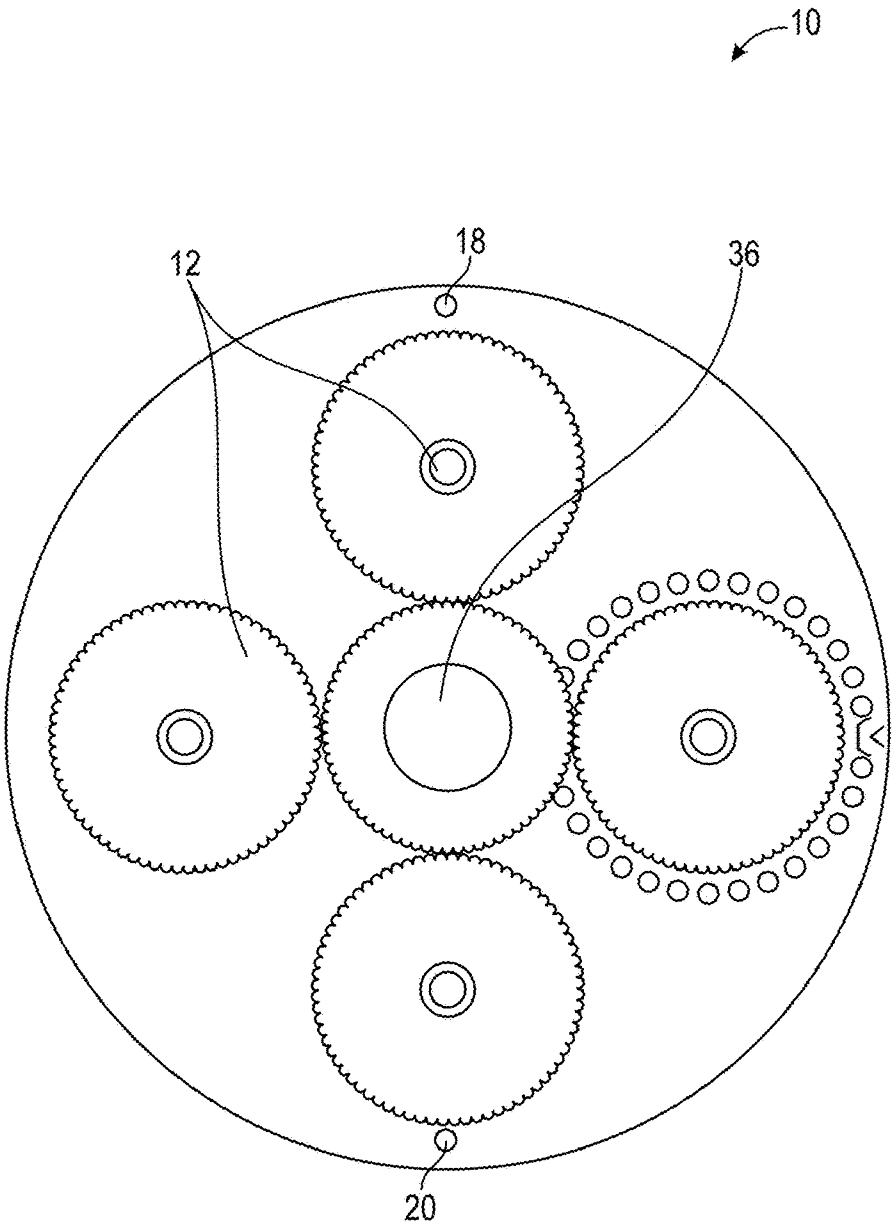
FIG. 4 is a front elevation sectional view of a fuel conditioning system according to an example embodiment of the invention.
Figure 5:
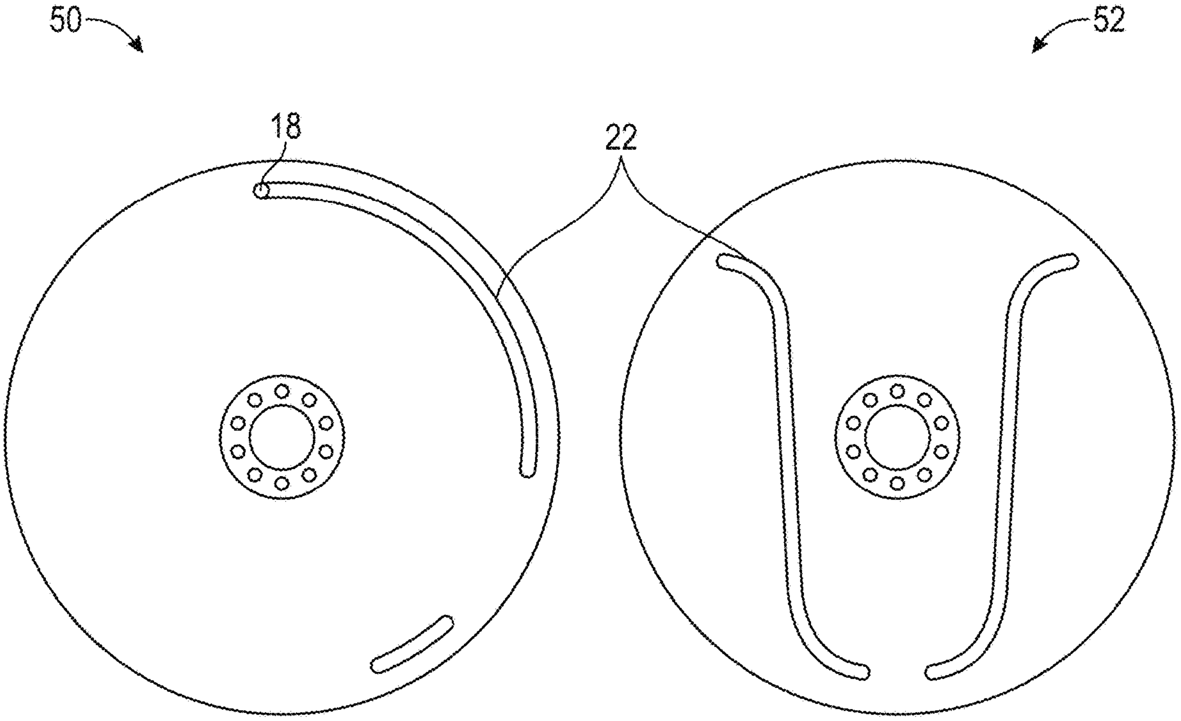
FIG. 5 provides a pair of front elevation sectional views of a pair of respective end plates of the fuel conditioning system of FIG. 1.
Figure 6:
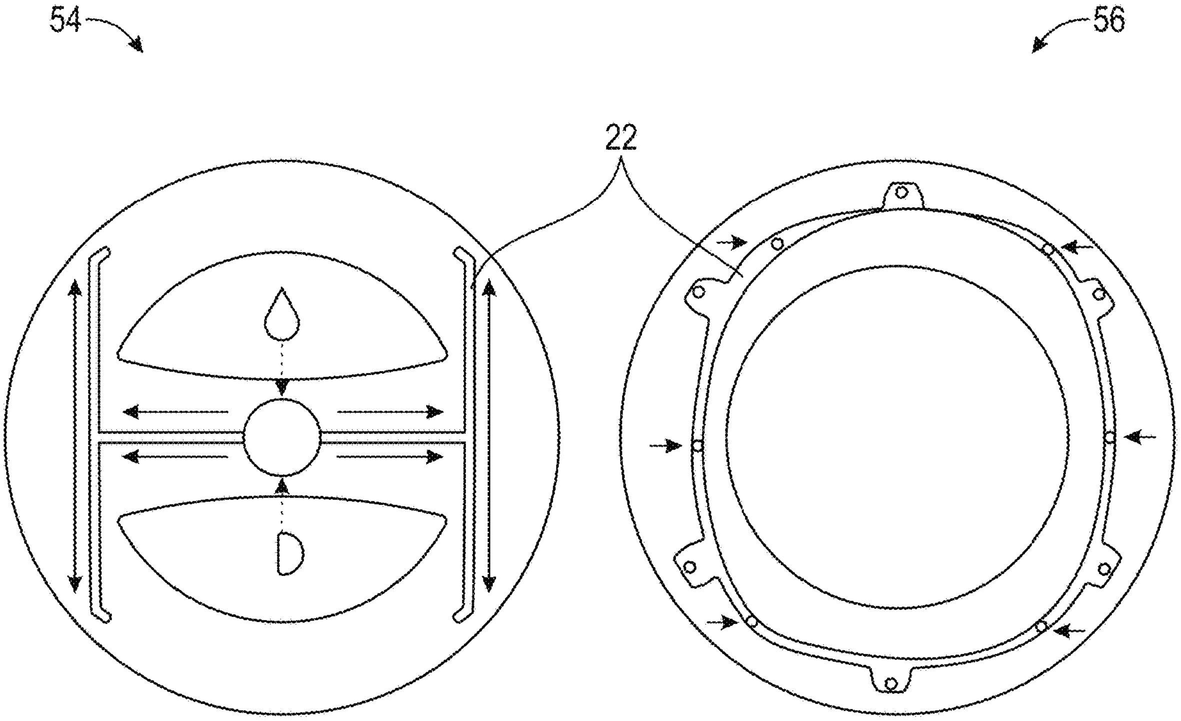
FIG. 6 provides a pair of front elevation sectional views of a pair of respective mating plates of the fuel conditioning system of FIG. 1.
Figure 12:
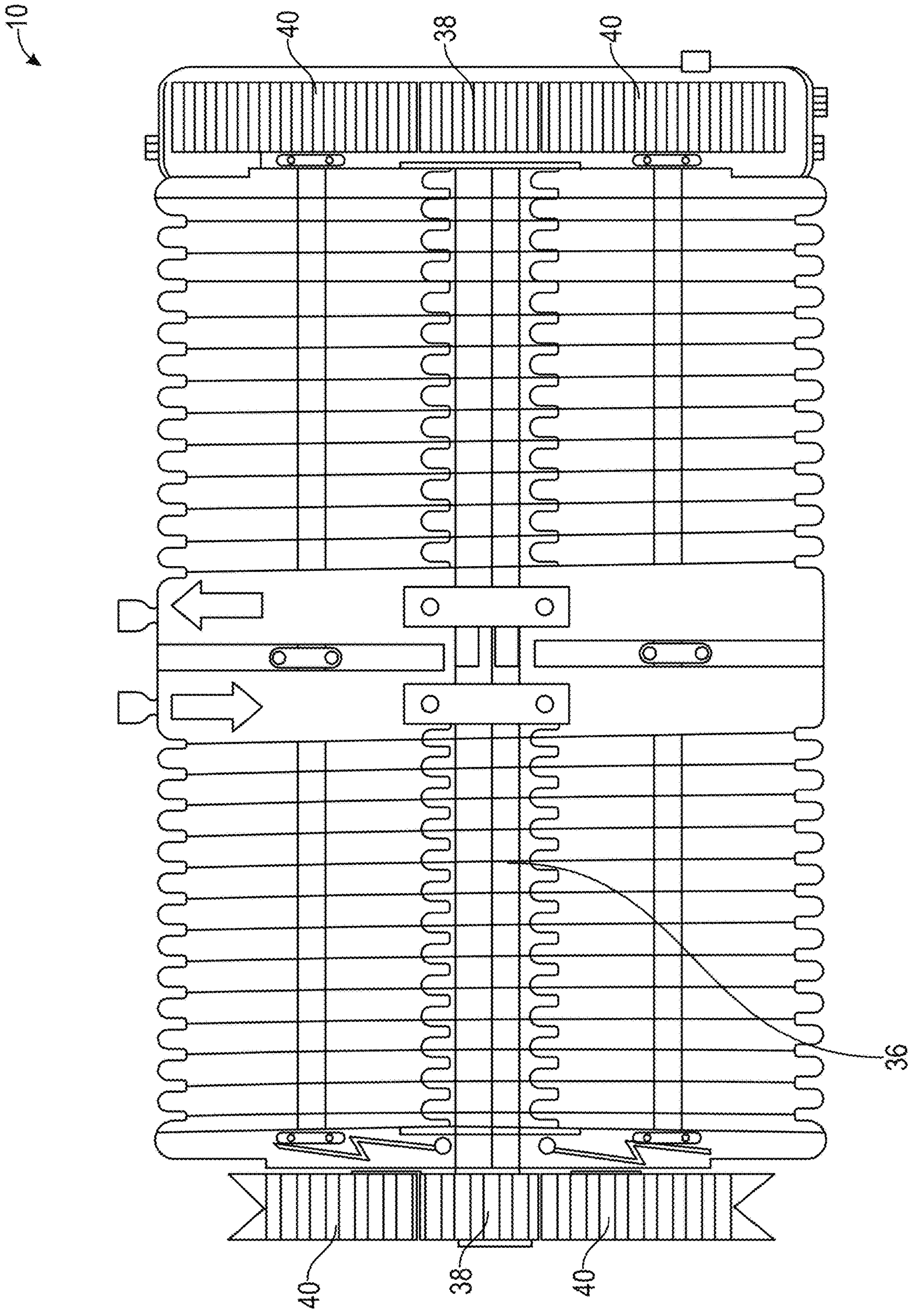
FIG. 12 is sectional plan view of a fuel conditioning system for an engine according to an example embodiment of the invention.

The various mixing vessels 12 may be disposed on opposed lateral sides of a principal drive axle 36 that extends centrally through a longitudinally axis of the set of vessels 12. The drive axle 36 may be operatively coupled to the nebulizing members 26 of each of the mixing vessels 12 by a gear arrangement to rotate the nebulizing members 26. The gear arrangement may comprise a first set of gears 38 that are connected to the principal drive axle 36. The first set of gears 38 may operatively drive a second set of gears 40. The second set of gears 40 are disposed inside the housing of the system 10 and are connected to rotational axles 28 that rotate the nebulizing members 26. In other examples, the second set of gears 40 may be disposed outside of the housing of the system 10, as depicted in FIG. 12. As shown in FIG. 4, the mixing vessels 12 may also be disposed above and below the principal drive axle 36. The drive axle 36 may be rotated using a suitable drive means such as, for example, an electric motor 42.

The conduit system 22 may comprise a set of pipe sections that are fluidly interconnected between the fluid inlet 18 and outlet 20 to transfer the diesel and water through the chain of connected mixing vessels 12. The pipe sections 22 may be integrated into a pair of end plates 50, 52 arranged at respective longitudinal ends of the connected vessels 12. The pipe sections 22 may also be integrated into a pair of mating plates 54, 56 that face each other at a centre of the system 10. In the example depicted in FIG. 1, the system 10 comprises a single inlet 18 that carries water and diesel mixed together into the input mixing vessel 14. In other examples, the system 10 may comprise a pair of separate inlets (not shown) for receiving fuel and water respectively into the input mixing vessel 14.

In use, the nebulizing members 26 are rotated about their respective axles 28 by the drive means 42 and diesel fuel and water is injected into the input mixing vessel 14 via the inlet 18. The fuel and water is sprayed in a mixture toward the axle 28 of the input mixing vessel 14 by the vessel's fluid dispensers 32. The fuel and water mixture comes into contact with the spinning nebulizing members 26 which operate to nebulize the mixture into a fine spray. Any ferromagnetic impurities in the resultant spray adhere to the magnets 30, thus removing them from the mixture. For example, the magnets 30 will remove any iron or nickel-based substances in the mixture that has been provided by the water and/or diesel. The nebulized mixture subsequently exits the input mixing vessel 14 via an outlet 44 provided in an inner wall of the vessel 14. The outlet 44 forms part of the conduit system 22 and feeds the nebulized fuel and water into the next mixing vessel 46. The next mixing vessel 46 operates in the same way as the input mixing vessel 14 to further nebulize and remove further ferromagnetic impurities from the fuel and water. The fuel and water is transferred by the conduit system 22 from vessel 46 through to the final, output mixing vessel 16 via each intermediate vessel 12. The fully nebulized and cleaned fuel and water mixture exits the output mixing vessel 16 via the outlet 20 and is then supplied to the engine for combustion.

Figure 7:
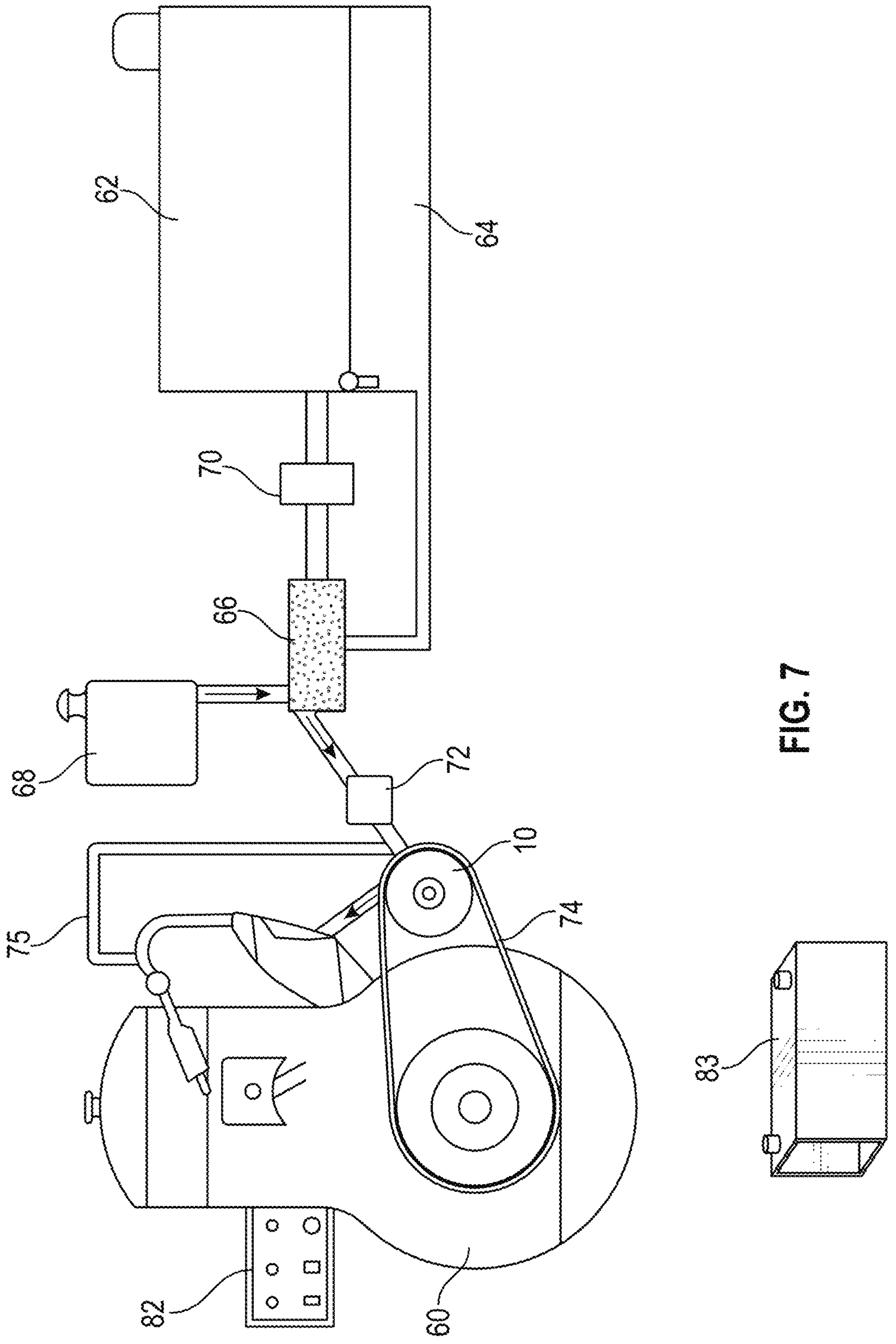
FIG. 7 is a schematic view of a diesel engine that includes the fuel conditioning system of FIG. 1.

Referring to FIG. 7, in one example the fuel conditioning system 10 may be used to supply nebulized diesel and water to a diesel engine 60. The diesel may be stored in a fuel tank 62 and the water may be stored in a subjacent water tank 64. The water and diesel may be combined together in a mixing block 66 before being supplied to the fuel conditioning system 10. The fuel conditioning system 10 may also comprise a tank 68 containing a fuel additive, such as engine lubricant, which includes an integrated pump for pumping the additive into the mixing block 66 to be combined with the water and diesel. A one way check valve 70 may control the flow of diesel into the mixing block 66. The fuel conditioning system 10 may also comprise an actuator, such as a solenoid 72, that controls the flow rate of fluid from the mixing block 66 into the engine 60. In the example shown, the nebulizing members 26 of the fuel conditioning system 10 are rotated by a drive belt arrangement 74 that is connected to a drive axle of the engine 60, rather than by an electric motor 42. The fuel conditioning system 10 may also comprise a return line 75 that returns any water/diesel that is not ignited by the engine 60 back to the fuel conditioning system 10 to be reprocessed and reused.

Figure 8:
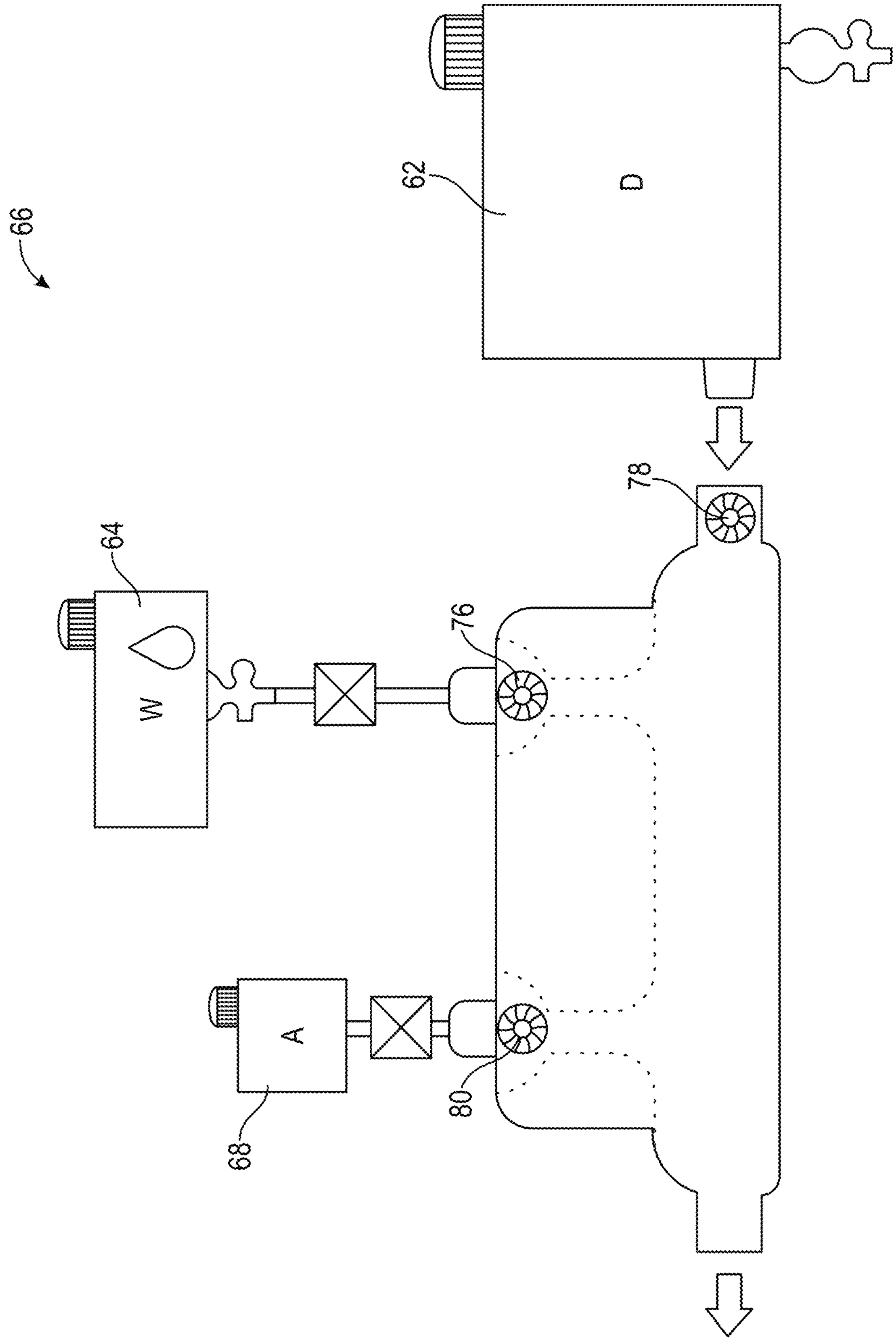
FIG. 8 is a schematic view of a mixing block of a fuel conditioning system according to an example embodiment of the invention.

Referring to FIG. 8, the mixing block 66 may comprise a pair of regulators 76, 78 for mixing the water and diesel together in a predetermined ratio before the resultant mixture is supplied to the engine 60. The ratio will be set such that the water/diesel mixture supplied to the engine 60 has an octane level that provides for efficient combustion. In one example, the predetermined ratio may be about 70% fuel and 30% water. The mixing block 66 may also comprise a regulator 80 that controls the amount of additive that is supplied into the water/diesel mixture.

Referring to FIG. 7, the diesel engine 60 and fuel conditioning system 10 may be integrated into an automobile that includes an electronic control system 82. In use, the control system 82 may be configured to execute an engine startup process that includes a warm up phase followed by an operating phase. During the warm up phase, the control system 82 may cause the engine 60 to run on diesel without receiving any nebulized diesel and water from the fuel conditioning system 10 for a period of time. In the operating phase, the control system 82 may cause the diesel engine 60 to receive nebulized diesel and water from the fuel conditioning system 10 for combustion by the diesel engine 60. The control system 82 may also be configured to execute an engine shutdown process. During the shutdown process, the control system 82 may stop nebulized diesel and water from being supplied to the engine 60 and cause the engine 60 to run on diesel only for a period of time to flush any water remaining in the engine 60. Power may be supplied to the control system 82 by a battery 83 and/or from the alternator of the engine 60.

Figure 9:
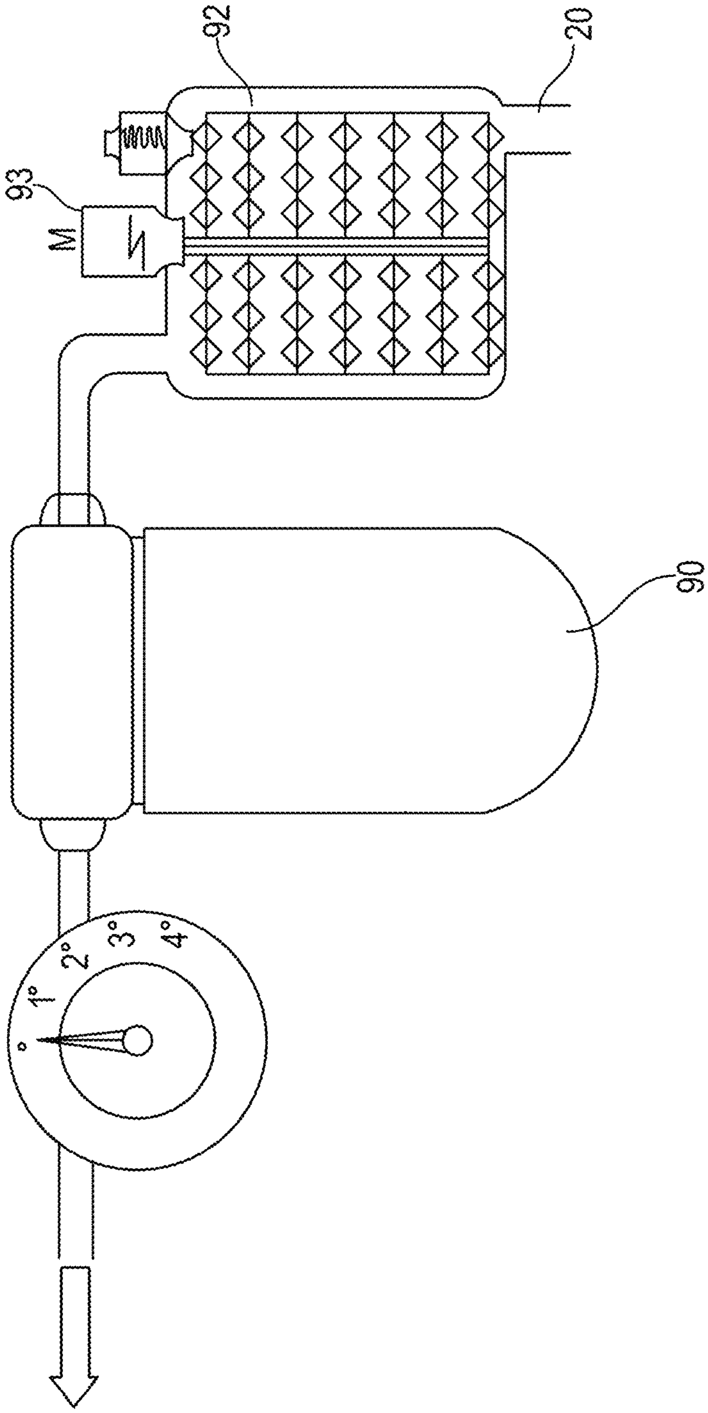
FIG. 9 is a schematic view of a filter device and final stage mixing vessel of a fuel conditioning system according to an example embodiment of the invention.

Referring to FIG. 9, in other examples a filter device 90 may be fluidly connected to the outlet 20 of the fuel conditioning system 10 to filter the nebulized water and fuel mixture before the mixture is supplied to the engine 60. The filter device 90 may comprise a screen fine filter, or similar porous-media filter. A further (final) mixing vessel 92 may also be fluidly interposed between the filter device 90 and the outlet 20. The final mixing vessel 92 may comprise a set of magnets and rotating nebulizing members and function in the same way as the other mixing vessels 12. The nebulizing members of the final mixing vessel 92 may be driven by an electric motor 93. In other examples, the fuel conditioning system 10 may comprise one or more additional filters arranged to filter the fuel and water before the fuel and water is supplied into the input mixing vessel 14.

Figure 10:
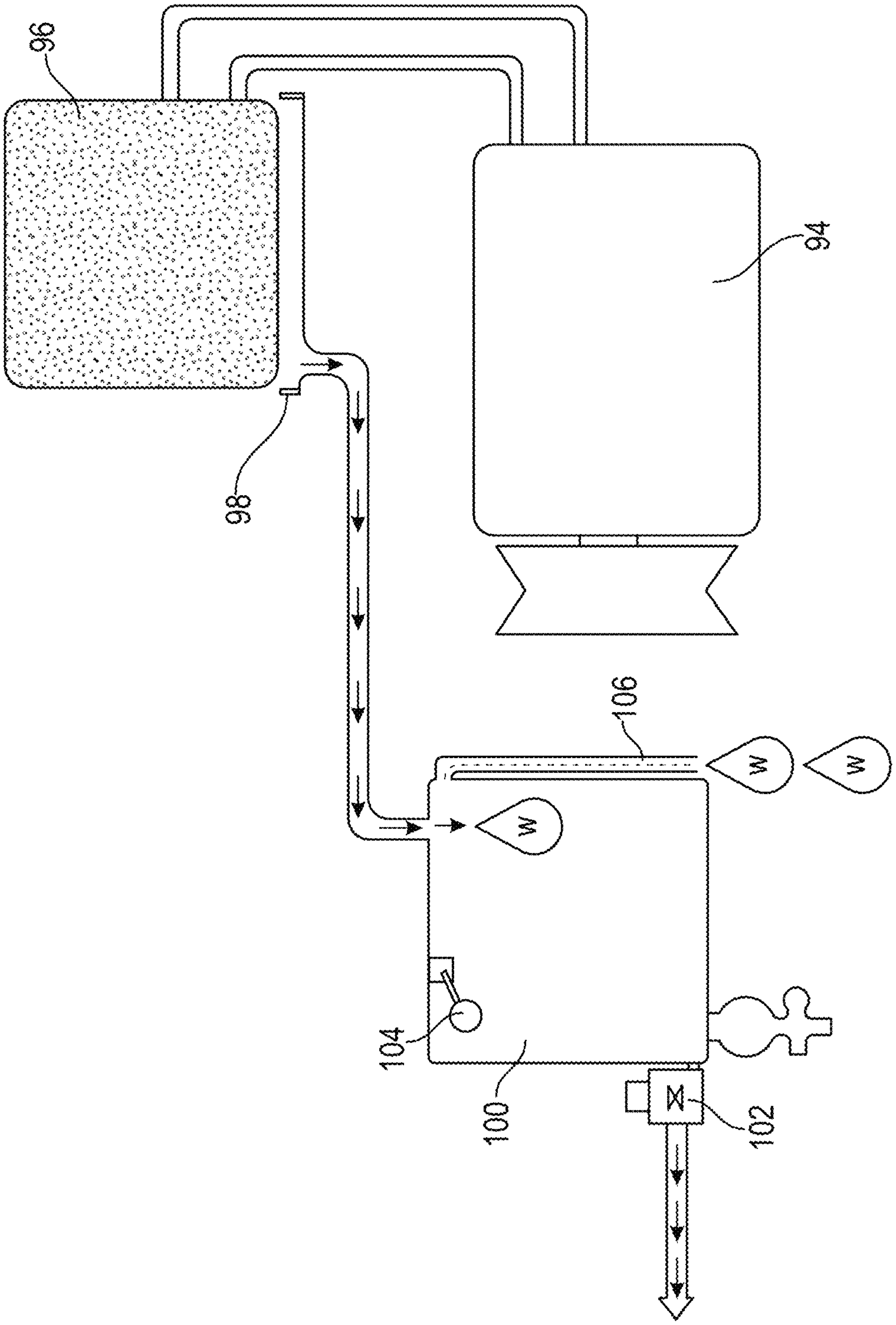
FIG. 10 is a schematic view of an air conditioning system of an automobile that comprises a fuel conditioning system according to an example embodiment of the invention.

The water in the water tank 64 that is used by the fuel conditioning system 10 may be supplemented by one or more additional water sources. For example, the system 10 may be installed in an automobile that has an air conditioning system that produces condensed water as a by-product of the air cooling process. The condensed water may be collected in a reservoir and supplied to the water tank 64 to replenish the water. Referring to FIG. 10, for example the air conditioning system may comprise a compressor 94 and a condenser 96, wherein condensed water produced by the condenser 96 falls into a collection tray 98. Water collected in the tray 98 may flow via a conduit into a holding tank 100. The water in the holding tank 100 may be periodically pumped from the tank 100 by a pump 102 into the main water tank 64 of the fuel conditioning system 10. The holding tank 100 may also comprise a float switch 104 that causes the pump 102 to switch on automatically when there is sufficient water in the tank 100 to be supplied to the main water tank 64. The holding tank 100 may comprise an overflow pipe 106 to prevent the holding tank 100 from overflowing (for example, should the float switch 104 fail to operate). In other examples, the water holding tank 100 may be used for purposes in addition to supplementing the main water tank 64. For example, the water may be periodically used, in combination with a filter, to provide drinking water for users of the automobile. The water may be used to supplement the radiator of the automobile's engine or the automobile's windscreen washing reservoir. The water may be used to provide water for a shower fitting in a recreational vehicle. In utility and heavy duty vehicles, the water may be used by a jet spray system for fire control or vehicle washing purposes.

Figure 11:
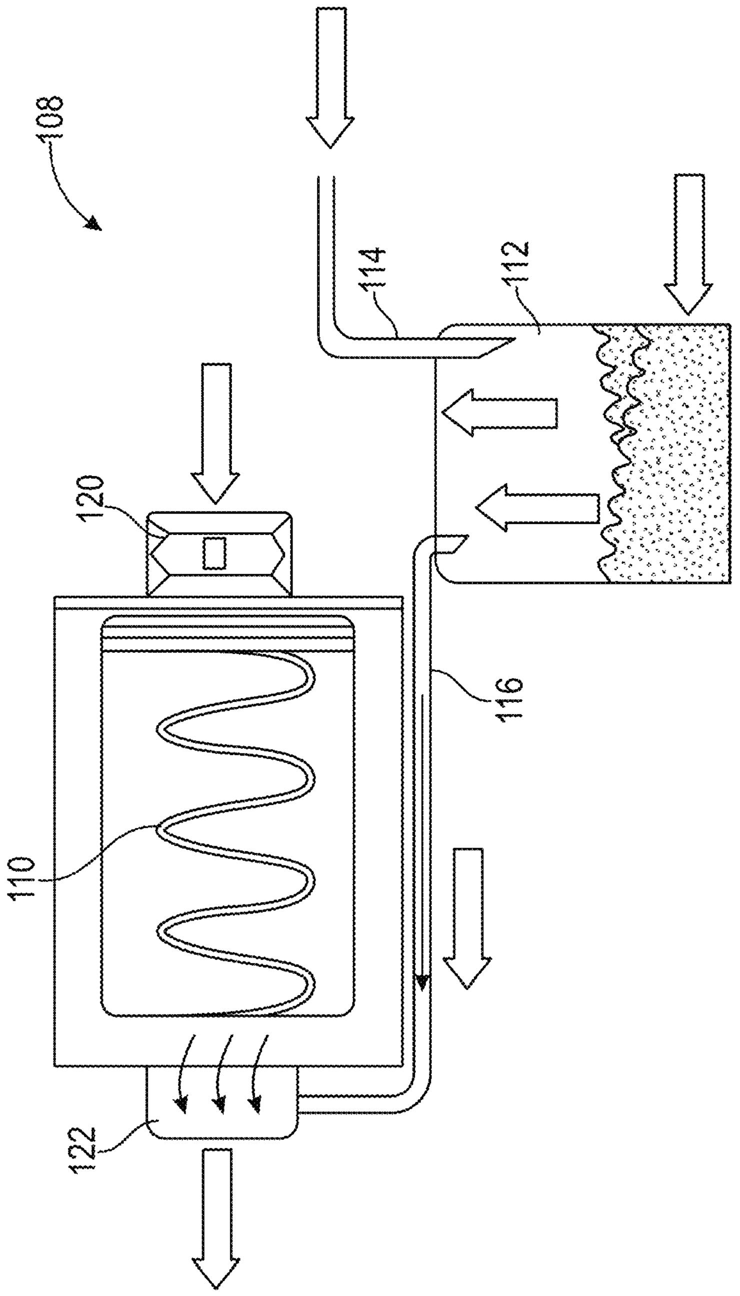
FIG. 11 is a schematic view of an air processing system of an automobile that comprises a fuel conditioning system according to an example embodiment of the invention.

Referring to FIG. 11, in other examples the diesel engine 60 may be connected to an air processing system 108. The air processing system 108 may comprise an air filtration system 110 for supplying filtered air to the engine 60. The air processing system 108 may also comprise a fuel tank 112 that has a fuel inlet pipe 114 and a fuel fumes vent 116. The vent 116 is arranged to supply diesel fumes from the fuel tank 112 to the engine 60. The air filtration system 110 may comprise an air pump/fan assembly 120 for supplying pressurised air into the air filtration system 110. In use, the diesel fumes flowing out of the outflow vent 116 are combined with the filtered air produced by the filtration system 110 in a mixing chamber 122 before the resultant gaseous mixture is supplied to the engine 60 to aid combustion. The engine 60 may inject the gaseous mixture into the engine cylinders along with nebulized water and diesel received from the fuel conditioning system 10.

The fuel conditioning system 10 advantageously generates a mixture of nebulized water and diesel (or other liquid fuel) for use by internal combustion engines which provides several significant benefits, including:

(i) The emissions produced by an engine that burns the nebulized water and diesel mixture contain less pollutants compared to conventional fuels. In particular, the emissions contain little or no carbon monoxide residue;
(ii) The nebulized mixture provides for improved combustion and resultant fuel economy;
(iii) The nebulized mixture results in less engine sludge and lower engine maintenance and operating costs;
(iv) The mixing vessel may be retrofitted into existing engines, including engines used in power generation equipment, industrial machinery and commercial vehicles.

For the purpose of this specification, the word "comprising" means "including but not limited to", and the word "comprises" has a corresponding meaning. It is to be understood that, if any prior art is referred to herein, such reference does not constitute an admission that the prior art forms a part of the common general knowledge in the art, in Australia or any other country.

The above embodiments have been described by way of example only and modifications are possible within the scope of the claims that follow.

The invention claimed is:

1. A fuel conditioning system for an engine, comprising:

a plurality of mixing vessels that include an input mixing vessel and an output mixing vessel;

at least one inlet for receiving fuel and water into the input mixing vessel;

at least one outlet for supplying the fuel and water from the output mixing vessel to the engine; and a conduit system arranged to transfer the fuel and water through each of the mixing vessels from the input mixing vessel to the output mixing vessel, wherein each of the mixing vessels comprises an internal chamber containing a plurality of nebulizing members, wherein the nebulizing members are configured to rotate about a rotational axis extending through the internal chamber to nebulize the fuel and water therein, and one or more magnets disposed in the internal chamber to attract ferromagnetic substances present in the fuel and/or water.

2. The fuel conditioning system according to claim 1, wherein the internal chamber comprises a plurality of fluid dispensers fluidly connected to the conduit system, wherein the fluid dispensers are arranged about an internal perimeter region of the internal chamber to spray the fuel and water toward the rotational axis.

3. The fuel conditioning system according to claim 2, wherein the nebulizing members and the magnets are arranged about the rotational axis inward from the fluid dispensers.

4. The fuel conditioning system according to claim 1, wherein the internal chamber comprises a plurality of elongate supports radially extending from the rotational axis, wherein each of the elongate supports comprises a set of the nebulizing members.

5. The fuel conditioning system according to claim 4, wherein each of the nebulizing members comprises a plurality of splines or blades.

6. The fuel conditioning system of claim 4, wherein each of the elongate supports has a set of the magnets attached thereto.

7. The fuel conditioning system according to claim 1, wherein the nebulizing members are arranged into a plurality of groups of nebulizing members, and wherein the magnets are arranged into a plurality of groups of magnets, and wherein the plurality of groups of magnets are interleaved within the plurality of groups of nebulizing members along the rotational axis.

8. The fuel conditioning system according to claim 1, wherein the mixing vessels are disposed on opposed lateral sides of a drive axle, wherein the drive axle is operatively coupled to the nebulizing members of each of the mixing vessels to rotate the nebulizing members.

9. The fuel conditioning system according to claim 8, wherein the drive axle is operatively coupled to the nebulizing members of each of the mixing vessels by a gear arrangement.

10. The fuel conditioning system according to claim 9, wherein the gear arrangement comprises a first set of gears that operatively drive a second set of gears, wherein the first set of gears are connected to the drive axle, and wherein the second set of gears are connected to rotational axles that rotate the nebulizing members.

11. The fuel conditioning system according to claim 8, wherein the mixing vessels are also disposed above and below the drive axle.

12. The fuel conditioning system according to claim 1, wherein the fuel conditioning system comprises a mixing device for mixing the fuel and water together in a predetermined ratio before the fuel and water is supplied into the at least one inlet.

13. The fuel conditioning system according to claim 12, wherein the predetermined ratio is about 70% fuel and 30% water.

14. The fuel conditioning system according to claim 12, wherein the fuel conditioning system comprises a pump for pumping fuel additive into the fuel and water after the fuel and water has been mixed together by the mixing device.

15. The fuel conditioning system according to claim 14, wherein the fuel additive comprises an engine lubricant.

16. The fuel conditioning system according to claim 1, wherein the fuel conditioning system comprises a pair of inlets for receiving the fuel and water into the input mixing vessel respectively.

17. The fuel conditioning system according to claim 1, wherein the fuel conditioning system also comprises a filter device fluidly connected to the outlet to filter fuel and water flowing from the outlet.

18. The fuel conditioning system according to claim 1, wherein the fuel conditioning system comprises an electric motor operatively configured to rotate the nebulizing members about the rotational axis.

19. The fuel conditioning system according to claim 1, wherein the nebulizing members are mechanically coupled to a drive axle of the engine to rotate the nebulizing members about the rotational axis.

20. A diesel engine comprising the fuel conditioning system according to claim 1.

* * * * *